US008853953B2

(12) United States Patent
Pollock et al.

(10) Patent No.: US 8,853,953 B2
(45) Date of Patent: Oct. 7, 2014

(54) HIGH EFFICIENCY LED POWER SUPPLY

(75) Inventors: Charles Pollock, Oakham (GB); Helen Pollock, Oakham (GB)

(73) Assignee: Technelec Ltd (GB)

( * ) Notice: Subject to any disclaimer, the term of this patent is extended or adjusted under 35 U.S.C. 154(b) by 0 days.

(21) Appl. No.: 13/881,082

(22) PCT Filed: Oct. 24, 2011

(86) PCT No.: PCT/GB2011/001521
§ 371 (c)(1),
(2), (4) Date: Apr. 23, 2013

(87) PCT Pub. No.: WO2012/052728
PCT Pub. Date: Apr. 26, 2012

(65) Prior Publication Data
US 2013/0214690 A1      Aug. 22, 2013

(30) Foreign Application Priority Data

Oct. 23, 2010 (GB) .................................. 1017901.8

(51) Int. Cl.
*H05B 37/00* (2006.01)
*H05B 39/00* (2006.01)
*H05B 41/00* (2006.01)

(52) U.S. Cl.
USPC ......... 315/185 R; 315/186; 315/192; 315/193

(58) Field of Classification Search
USPC .............................. 315/185 R, 186, 191–193
See application file for complete search history.

(56) References Cited

U.S. PATENT DOCUMENTS

| 8,698,423 B2 * | 4/2014 | Zhang et al. | 315/307 |
| 2003/0132712 A1 | 7/2003 | Wood | |
| 2011/0068692 A1 * | 3/2011 | Tian et al. | 315/113 |

FOREIGN PATENT DOCUMENTS

| EP | 1215944 A1 | 6/2002 |
| GB | 2466940 A | 7/2010 |
| JP | 2007311317 A | 11/2007 |

OTHER PUBLICATIONS

International Search Report for corresponding application No. PCT/GB2011/001521 filed Oct. 24, 201; Mail date Feb. 8, 2012.
Written Opinion or corresponding application No. PCT/GB2011/001521 filed Oct. 24, 201; Mail date Feb. 8, 2012.
International Preliminary Report on Patentability for corresponding application No. PCT/GB2011/001521 filed Oct. 24, 2011; Mail date Apr. 23, 2013.

* cited by examiner

*Primary Examiner* — Anh Tran
(74) *Attorney, Agent, or Firm* — Cantor Colburn LLP

(57) ABSTRACT

There is an increasing need for simple and low cost power supplies to control loads such as battery chargers and LEDs. It is the object of this invention to provide an alternative method for the control of current in such loads with very high efficiency and to reduce the variation of load current with supply voltage. This invention is particularly relevant to LED power supplies or battery chargers and provides an electronic power supply for the control of an electrical load connected to an electrical source, the electrical load comprising a main load with at least one LED and an auxiliary load with at least one LED, the electronic power supply comprising a series compensation block connected in series with the main load and the voltage source, the series compensation block providing a voltage in opposition to the voltage source by directly controlling the power delivered to the auxiliary load and indirectly controlling the power converted in the main load.

12 Claims, 3 Drawing Sheets

High Efficiency LED Power Supply

HIGH EFFICIENCY LED POWER SUPPLY

The present invention relates to an electronic power supply of very high efficiency. The invention is particularly suited for driving LEDs.

There is an increasing need for simple and low cost power supplies to control loads such as LEDs. There are significant numbers of new applications where LEDs can be used instead of more traditional lighting systems in automotive, industrial and domestic applications. In all cases the need for the highest possible efficiency is essential to ensure that energy dissipation is minimised and hence the size and cost of the power supply is kept as small as possible.

In renewable energy applications it is useful to charge batteries and supply power to various loads with the highest possible efficiency.

To maintain high efficiency while a controlling current in a load such as a battery charger, an LED system an electronic drive circuit can be used as shown in FIG. 1. A voltage source, 1 supplies an electronic drive circuit, 4, which may be a buck (step down), boost (step up), buck-boost (step down-up) or any other common dc to dc converter circuit.

When an electronic power supply is used to supply an LED system it is essential to control the current in the load and not the voltage. This is because there can be significant variation in the forward voltage of an LED and a fixed voltage drive would produce an uncertain current and different light levels. To eliminate such variations the current in the LED system is monitored and a feedback circuit adjusts the control of the electronic drive circuit to maintain the current in the LED system to a constant or pre-determined value, thus rejecting variations in the supply voltage or the LED forward voltage caused by manufacturing tolerances or temperature. The electronic drive circuit can be used to vary the controlled current through the LED system to provide brightness control. Robustness and flexibility has made it common to use electronic drive circuits based on prior art dc to dc converter circuits for the control of LED systems. It is common in such electronic drive circuits to use pulse width modulation of the power switch or switches in the electronic drive circuit to achieve control of the LED system.

Whilst the electronic drive circuit provides control of the LED current, there are losses within the electronic drive circuit. These losses are associated with the switching and conduction of the current within the electronic power devices. These losses reduce the LED system efficiency. Typical prior art electronic drive circuits used for driving LEDs would have efficiencies in the region 80-95%, depending on operating conditions. In most cases the efficiency would be in the range 80-90%.

In order to improve the efficiency of the electronic drive circuit for LEDs it is beneficial to use resonant circuit techniques. In resonant circuits the switching losses in the switching transistors can be virtually eliminated and the efficiency of the electronic drive circuit can be improved. One such circuit is disclosed in US Patent Application 2010/0141169. In US Patent Application 2010/0141169 an LCL series parallel resonant circuit is used to drive LEDs. The circuit exploits a characteristic of the LCL series parallel resonant circuit published in "A constant frequency, constant current, load-resonant capacitor charging power supply", IEE Proc. Electric Power Applications, Vol. 146, Issue 2, pp. 187-192, March 1999.

The use of the constant output current characteristics of LCL series parallel resonant circuit to drive LEDs as disclosed in US Patent Application 2010/0141169 results in the current through an LED string being independent of the number of LEDs in the string or the forward voltage of the individual LEDs. Furthermore, the removal of a series connected current measurement resistor and the reduction in switching losses due to resonant switching results in a high efficiency LED power supply, with efficiency reaching 85%-92%.

However, in this LCL series-parallel resonant circuit, the current through the LED load is not independent of the supply voltage. This means that if the circuit is used to drive an LED load from a variable voltage input the current in the LEDs will change in proportion to the input voltage. This is undesirable in for example a lighting system supplied by a battery, where the light output would fall as the battery voltage drops.

The conduction losses of the electronic power devices are dependent on the structure of the device such as MOSFETs or IGBTs. The conduction losses increase with the voltage drop across the device and with the conducted current. The voltage drop tends to increase in devices which are designed to offer a higher rated voltage or sustaining voltage.

It is the object of this invention to provide an alternative method for the control of current in a load, such as an LED system or a battery charger, with very high efficiency and reduce the variation of load current with supply voltage.

According to this invention there is provided an electronic power supply for the control of an electrical load connected to an electrical source, the electrical load comprising a main load containing at least one LED and an auxiliary load containing at least one LED, the electronic power supply comprising a series compensation block connected in series with the main load and the electrical source, the series compensation block providing a voltage in opposition to the voltage source while controlling the power delivered to the auxiliary load.

The series compensation block according to this invention directly controls the power delivered to the auxiliary load and indirectly controls the power converted in the main load.

According to this invention the main load or the auxiliary load can incorporate at least one LED.

According to a further aspect of this invention the main load or the auxiliary load can incorporate batteries or capacitors which are being charged by an electrical source.

The invention will now be described using the following diagrams.

Figure 1:
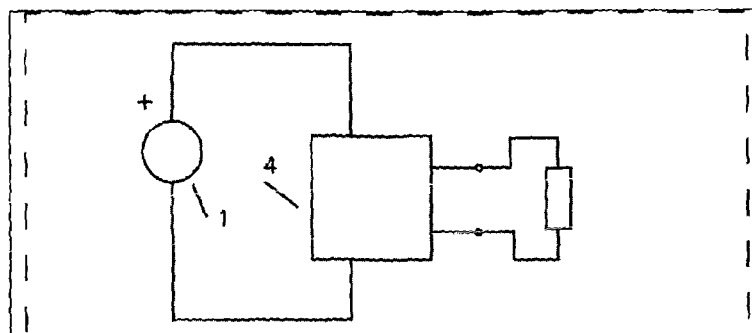
FIG. 1 shows a voltage source with electronic power supply controlling an LED system according to the prior art.
Figure 2:
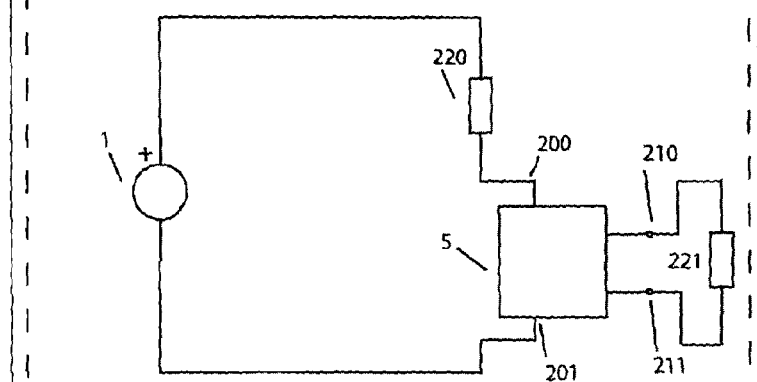
FIG. 2 shows an example of a circuit according to the invention in which a voltage source is connected to a series compensation block with an auxiliary load.

An electrical load controlled according to the invention is shown in FIG. 2. The electrical load can be of many types. By means of example only, two common loads for which the invention is very appropriate are battery chargers and LED lighting. The implementation of the invention requires the load to be split into two parts, referred to as the main load and the auxiliary load. The main load and auxiliary load may be two parts of the same load or two completely different devices.

In FIG. 2, a voltage source 1 is used to supply power to an electrical load, comprising main load 220 and auxiliary load 221. A series compensation block 5 operates to provide a voltage in opposition to the voltage source 1 such that the voltage across the main load, 220, is regulated. The series compensation block has input terminals, 200, 201, and output terminals 210, 211. The auxiliary load, 221, is connected across the output terminals 210, 211 of the series compensation block.

Figure 3:
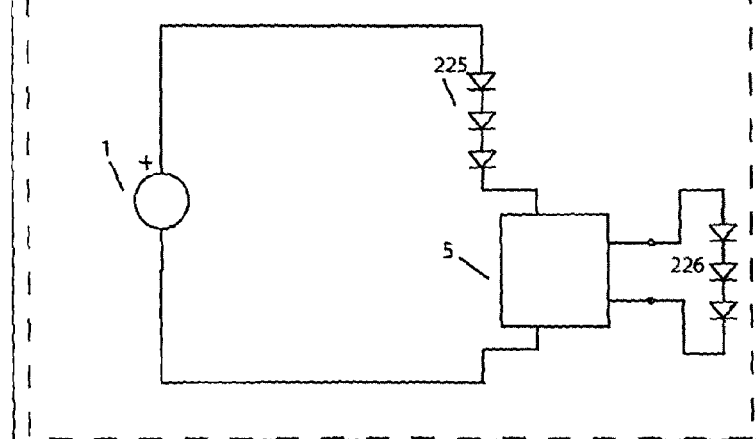
FIG. 3 shows an example of a circuit according to the invention in which the main load and auxiliary load comprise strings of two or more LEDs.

If the invention is used to control LEDs, the main load 220 and auxiliary load 221 may both be LED strings comprising one or more LEDs in series or parallel. FIG. 3 shows an example of the invention employed to drive LEDs. The main load 225 incorporating one or more LEDs. The auxiliary load 226 incorporating one or more LEDs. The invention is particularly effective where it is desired to have a number of LEDs connected in series to create a greater light output. In such a case the main load will contain a string of LEDs connected in series. The auxiliary load may also contain a string of LEDs connected in series.

The series compensation block 5 will now be described in more detail by means of some examples.

Figure 4:
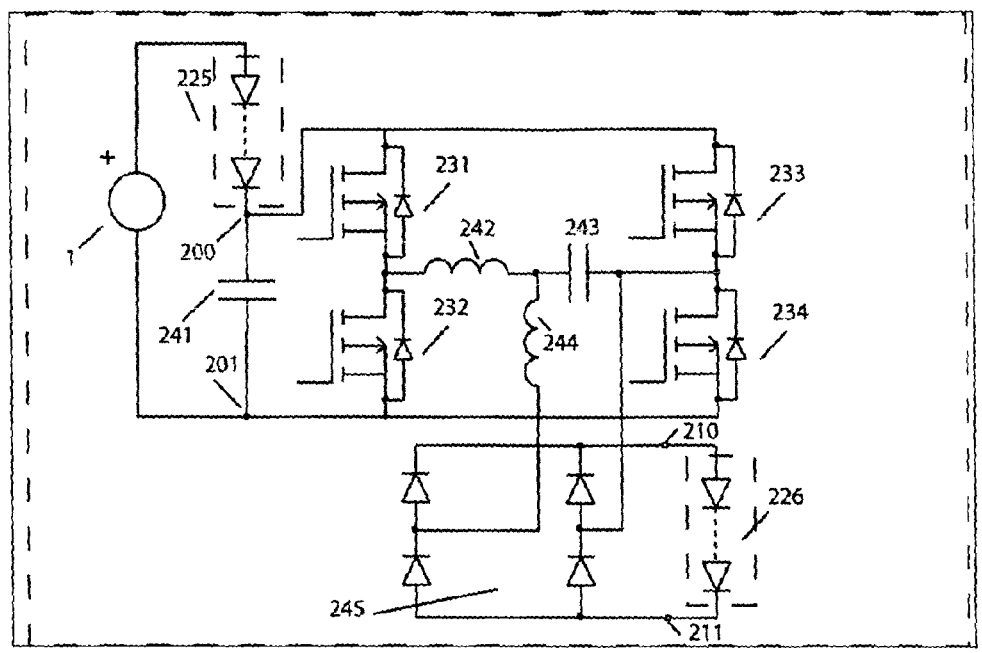
FIG. 4 shows an example of a circuit according to the invention in which the series compensation block incorporates a LCL series-parallel resonant circuit.

FIG. 4 shows the voltage source, 1, supplying, a main load, 225, in series with the series compensation block, 5. The main load, 225, shown in FIG. 4, comprises an LED system, made up of one or more LEDs connected in series and/or parallel. The series compensation block has input terminals 200, 201 and output terminals 210, 211 and comprises a dc-ac-dc resonant inverter. The resonant circuit elements are arranged with both series and parallel paths. This resonant circuit arrangement is known as series parallel resonant circuit and this combination of inductor, capacitor and inductor as LCL series-parallel resonant circuit.

A capacitor, 241, supports the voltage across the input terminals 200, 201 of the series compensation block. A high frequency inverter comprising four switching devices 231, 232, 233 and 234 deliver an alternating voltage to the resonant circuit comprising inductor 242, capacitor 243 and inductor 244. A rectifier 245 in series with the resonant inductor 244 converts high frequency alternating current to direct current through an auxiliary load 226. The auxiliary load, 226 in FIG. 4 is shown as a further LED system. The LED system of the main load 225 and the LED system of the auxiliary load, together form a complete LED load and can be mounted together to produce a total light output which is greater than the light output from each individually.

The characteristic features of the LCL series parallel resonant circuit have been described in the prior art and when it is operated at a frequency where the reactances of the resonant components have equal magnitude, the output current is known to be $$I_0 = k\frac{V_{in}}{X_L} \qquad (1)$$

Where $V_{in}$ is the dc supply voltage to the inverter switches and k is a constant taking account of the switching strategy of the inverter, effective ac voltage of the square wave excitation and of the ac to dc output rectifier. Thus, in the LCL series resonant circuit, when $X_{242} \approx X_{244} \approx -X_{243}$, the current in the load is proportional to $V_{in}$ In the series compensation block illustrated in FIG. 4 the output current from the output terminals of the series compensation block, passes through the auxiliary load, 226, which is an LED system. The forward voltage drop of the auxiliary load comprising one or more LEDs connected in series or parallel is relatively constant over a wide range of output current. The output power, $P_o$, taken from the output terminals is therefore $$P_o = V_o I_o = k\frac{V_o V_{in}}{X_L} \qquad (2)$$

The power absorbed at the input terminals, $P_{in}$, is $$P_{in} = V_{in} I_{in} \qquad (3)$$

Assuming the losses in the series compensation block are small compared to the output power, then the input power is approximately equal to the output power and $$I_{in} = k\frac{V_o}{X_L} \qquad (4)$$

This equation for the input current to the series compensation block shows that the input current to the series compensation block is approximately constant when the output voltage of the series compensation block is approximately constant. The input current to the series compensation block will be constant if the voltage at the output terminals is constant. Therefore by connecting an auxiliary load made up of one or more LEDs, the output voltage of the series compensation block is relatively constant and under these conditions the input current to the series compensation block will be constant independent of the main load and the supply voltage, providing the supply voltage is sufficient to drive the constant current through the main load.

The voltage across the input terminals of the series compensation block automatically adjusts to oppose any changes in supply voltage while maintaining constant current in the main load.

Therefore, this invention guarantees constant current in a main load by providing a series compensation voltage at the input terminals of a series compensation block, the series compensation voltage automatically changing to oppose any variation in supply voltage. Furthermore, an auxiliary load connected to the output terminals of the series compensation block carries a predictable current substantially independent of small changes in LED forward voltage and without requiring any current feedback circuits.

The major benefit of using this invention for the control of loads such as LEDs is the high levels of efficiency achieved by this circuit. To illustrate this improvement in efficiency a simple example will be given. Assume that the voltage dropped across the main load is $V_L$ in a total supply voltage, $V_s$, with the remaining voltage supported by the series compensation block.

If the current drawn from the supply is $I_s$, then the input power to the whole circuit is $$P_{input} = I_s V_s \qquad (5)$$

There are no losses incurred in the delivery of the power to the main load and if it is assumed that the efficiency of the power conversion of the series compensation block is η where 0<η<1, then the useful output power of the whole circuit according to the invention is given by $$P_{output} = I_s V_L + \eta I_s (V_s - V_L) \qquad (6)$$

And the system efficiency is $$\text{Efficiency} = \left[\eta + (1-\eta)\frac{V_L}{V_s}\right] \times 100\% \quad (7)$$

The efficiency of a circuit according to this invention will always be higher than the efficiency of the series compensation block alone. If the efficiency of the series compensation block is 0.9 (90%), and the voltage across the main load is half the supply voltage, the efficiency of the circuit according to this invention will be increased to 95%.

A further advantage of this circuit is that since the main load drops a significant percentage of the supply voltage, the voltage rating of the series compensation block is lower than the total supply voltage. This means that the electronic components can have lower voltage ratings and as a result will have lower losses, giving a further improvement to system efficiency.

This invention therefore provides a way of controlling the current through a main load, over a range of supply voltages, while also delivering power to an auxiliary load and achieves very high system efficiency.

The series compensation block according to the invention is connected in series with the main load and the voltage source in such a way to develop a voltage in opposition to the voltage source such that the difference between the voltage source and the series compensation voltage is the required voltage across the main load. The control of the voltage developed across the series compensation block is achieved by the controlling switch or switches within the series compensation block controlling the power delivered to the auxiliary load.

This invention provides the advantage that only the power delivered to the auxiliary load is directly controlled by the series compensation block. The losses in the series compensation block are limited to a fraction of the power delivered to the auxiliary load. The power delivered to the main load is indirectly controlled by the series compensation block. There are no additional losses associated with the delivery of the power to the main load. This is why the efficiency of circuits according to this invention can be so high. Since the voltage across the terminals of the series compensation block is less than the voltage at the terminals of the voltage source the voltage rating of the power electronic components in the series compensation block can be lower than required for a prior art electronic power supply controlling an electrical load as a whole. Components with lower voltage rating have lower conduction voltage drops and lower switching losses. This means that the conduction and switching losses of a circuit according to the invention can be dramatically lower than a circuit according to the prior art.

Figure 5:
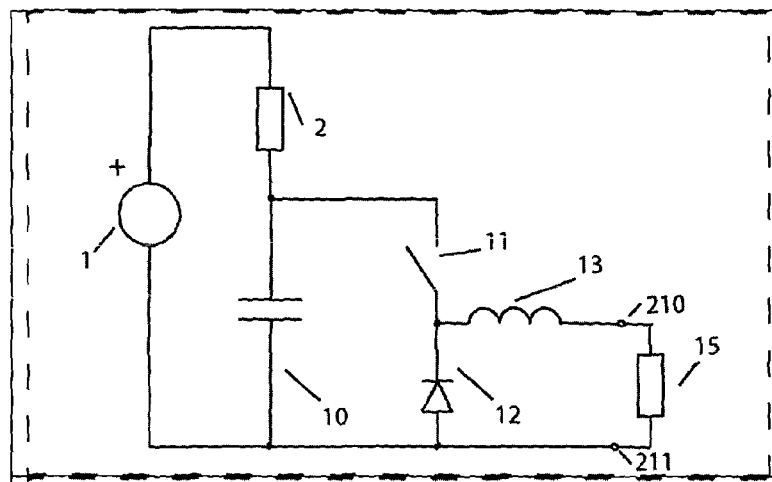
FIG. 5 shows an example of a circuit according to the invention in which the series compensation block is implemented with a buck converter.

FIG. 5 shows a further example of the invention in which the series compensation block is implemented with a buck converter or step down dc to dc converter. The voltage across the input terminals of the series compensation block is the voltage across the capacitor 10 which in FIG. 5 is connected in series with the voltage source, 1, and the main load 2. The voltage of the voltage source is $V_s$. The voltage dropped across the main load is $V_L$. A power switch 11 and diode 12 are used in conjunction with an inductor 13 to supply current to the auxiliary load 15. The step down dc to dc converter is controlled by repeatedly switching the power switch 11 with a variable on time to period ratio referred to as duty ratio, D. If the current in inductor 13 does not drop to zero during the time when the power switch is off, the inductor current is said to be continuous. When this is true the relationship between the voltage, $V_s-V_L$, across the input terminals of the series compensation block and the voltage $V_o$, across the auxiliary load 15 connected to the output terminals of the series compensation block is given by $$\frac{V_o}{V_s - V_L} = D \quad (8)$$

and the relationship between the current $I_o$ in the auxiliary load 15 and the current $I_s$ in the main load is given by $$\frac{I_o}{I_s} = \frac{1}{D} \quad (9)$$

The duty ratio D provides flexibility in the way the circuit is used. It is possible to operate the circuit in the same way as the first aspect of the invention, to make the current through the main load constant. If it is again assumed that the auxiliary load is an LED string in which there is little variation in forward voltage with increasing current, then $V_o$ is approximately constant, and according to equation (9) the duty ratio needs to be varied inversely with $V_s-V_L$. By doing so the voltage across the input terminals will have a value which maintains a relatively constant voltage across the main load and therefore maintains the current in the main load to be constant.

The duty ratio, D, can be varied by control of on time in a fixed period; this is known as pulse width modulation. Alternatively the on-time or off-time may be held constant with a variation in frequency. As a further alternative, the on-time and off-time may be determined solely by the current in the inductor 13 reaching particular values.

Figure 6:
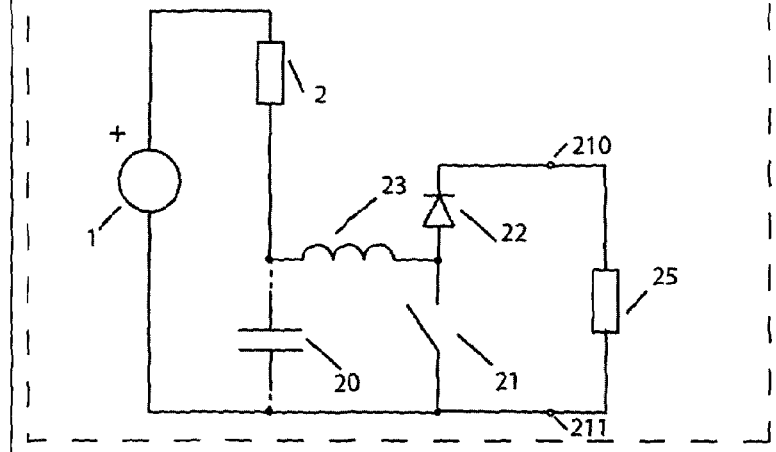
FIG. 6 shows an example of a circuit according to the invention in which the series compensation block is implemented with a boost converter.

FIG. 6 shows a further implementation of the invention in which a boost converter is used in the voltage compensation block. A voltage source 1 is connected to a main load 2 and series compensation block comprising a boost converter. The voltage across the input terminals of the series compensation block is the voltage across the capacitor 20 and is given by $V_s-V_L$. A power switch 21 and diode 22 are used in conjunction with an inductor 23 to supply current to the auxiliary load 25. The step up or boost dc to dc converter is controlled by repeatedly switching the power switch 21 with a variable on time to period ratio referred to as duty ratio, D. The voltage Vo at the output terminals of the series compensation block is higher than the voltage at the input terminals. As with buck converter the duty ratio, D can be used to deliver constant current through the main load, in continuous current mode the duty ration function which would deliver approximately constant current through a main load when the auxiliary load is a constant voltage load would be:

$$D = 1 - \frac{V_s - V_L}{V_o} \quad (10)$$

The capacitor 20 in the circuit of FIG. 6 is optional and can be removed without significantly changing the operating principles of the circuit.

Figure 7:
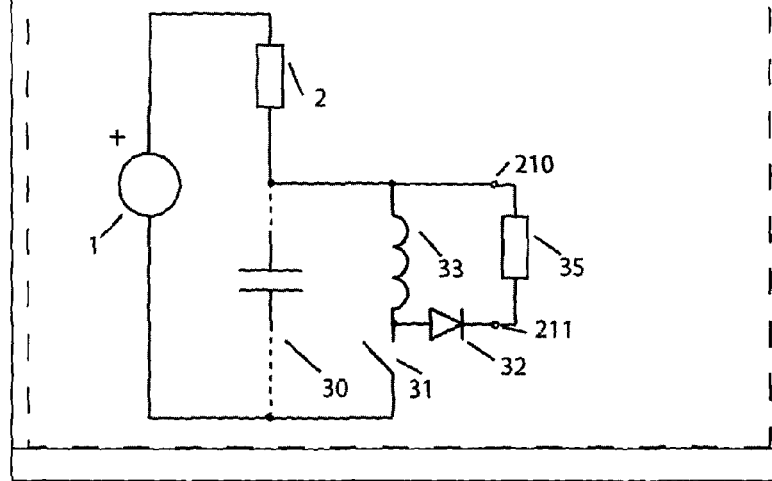
FIG. 7 shows an example of a circuit according to the invention in which the series compensation block is implemented with a buck boost converter.

FIG. 7 shows a further implementation of the invention in which a buck-boost converter is used in the voltage compensation block. A voltage source 1 is connected to a main load 2 and series compensation block comprising a buck-boost converter. The voltage across the input terminals of the series compensation block is the voltage across the capacitor 30 and is given by $V_s-V_L$. A power switch 31 and diode 32 are used in conjunction with an inductor 33 to supply current to the auxiliary load 35. The voltage across the auxiliary load can be smaller or greater than the voltage across the input terminals of the series compensation block.

The dc to dc converters discussed in these examples do not have magnetic isolation. There are a wide range of dc to dc converters which can be used in the series compensation block which can include magnetic isolation of the auxiliary load from the rest of the circuit. For example a flyback converter is a step up-down converter with the inductor split into two coupled windings.

The voltage source shown in all the examples of the circuit has been assumed to be a dc source. This can be provided by a battery where the high efficiency of the circuits according to the invention will be a significant advantage, leading to longer running times for the load. However in many applications a mains ac supply is available and the voltage source will require an ac to dc rectifier circuit. In the case of an ac source feeding an ac to dc rectifier, a smoothing capacitor may be connected across the dc output terminals of the rectifier to reduce the ripple of the rectified voltage. The operation of any of the circuits according to this invention is not in any way dependent on the presence or particular value of the smoothing capacitor.

The examples described have all related to loads which require dc current. In FIG. 4 the rectifier located after the LCL resonant circuit need not be present if the auxiliary load does not require dc current. Potentially the auxiliary load could be a heating load which can be operated from the high frequency alternating current without rectification.

In all the examples given the circuits have employed a voltage source. This could be replaced by any electrical source capable of supplying electrical energy such as a current source. For example the electrical source could be a photo-voltaic cell in which case the source characteristics would be more like a current source. A current source is suitable for use with the circuits according to this invention.

In another aspect of the invention the auxiliary load or the main load can contain one or more batteries. For example, in a wind powered generator or photo-voltaic system, it is usual to use the electrical energy to charge one or more batteries. However it is necessary to be able to control the current flowing into the battery or batteries to ensure that the battery system is not overcharged. Implementing a battery charging system according to this invention has the advantage that the energy delivered to the main load and auxiliary loads can be varied. If one or more batteries are used as the main load the current through the batteries or battery can be regulated. As the batteries or battery charges the series compensation voltage can be used to prevent overcharge even when the source voltage exceeds the battery voltage. In cases when the source voltage increases (for example due to higher wind speed or high levels of sunlight) the series compensation voltage can be increased to regulate the voltage across or current through the main load in a similar manner when a battery forms part of the auxiliary load in a circuit according to the invention the series compensation block can control the charging voltage and current of the auxiliary load while excess energy can be utilised for other purposes in the main load. Using the circuit according to the invention facilitates the charging of batteries with very high efficiency while also providing the option to supply a second load system when the battery capacity is exceeded. As a further alternative both the main load and auxiliary load can contain batteries for charging such that the series compensation block according to the invention directly controls the power delivered to the auxiliary load and indirectly controls the power converted in the main load.

The control of the circuits according to this invention can be achieved by monitoring any voltage or current in the circuit or by open loop methods. For example it would be possible for the controller in the series compensation block to adjust the voltage across its terminals to oppose any changes in the voltage of the electrical source. Alternatively the controller can be implemented to control the current in the main load and/or the auxiliary load.

The invention claimed is:

1. An electronic power supply for the control of an electrical load, the electrical load comprising a main load containing at least one LED and an auxiliary load containing at least one LED, the electronic power supply comprising a series compensation block connected in series with the main load and an electrical source, wherein the series compensation block develops a voltage in opposition to the electrical source while controlling the power delivered to the auxiliary load.

2. An electronic power supply according to claim 1 wherein the series compensation block directly controls the power delivered to the auxiliary load and indirectly controls the power converted in the main load.

3. An electronic power supply according to claim 1 wherein the electrical source is a voltage source.

4. An electronic power supply according to claim 1 wherein the main load contains an LED string with two or more LEDs connected in series.

5. An electronic power supply according to claim 1 wherein the auxiliary load contains an LED string with two or more LEDs connected in series.

6. An electronic power supply according to claim 1 wherein the series compensation block contains an LCL series-parallel resonant circuit.

7. An electronic power supply according to claim 1 wherein the series compensation block contains a step down dc to dc converter.

8. An electronic power supply according to claim 1 wherein the series compensation block contains a step up dc to dc converter.

9. An electronic power supply according to claim 1 wherein the series compensation block contains a step up-down dc to dc converter.

10. An electronic power supply according to claim 1 wherein the series compensation block contains a dc to dc converter without magnetic isolation.

11. An electronic power supply according to claim 1 wherein the series compensation block contains a dc to dc converter with magnetic isolation.

12. An electronic power supply for the control of an electrical load, the electrical load comprising a main load and an auxiliary load, at least one of the main load or the auxiliary load containing one or more batteries, the electronic power supply comprising a series compensation block connected in series with the main load and an electrical source, wherein the series compensation block provides-develops a voltage in opposition to the electrical source while controlling the power delivered to the auxiliary load.

* * * * *